United States Patent
Li (10) Patent No.: US 12,014,110 B2
(45) Date of Patent: Jun. 18, 2024

(54) AUDIO DEVICE AND ASSOCIATED CONTROL METHOD

(71) Applicant: Realtek Semiconductor Corp., HsinChu (TW)

(72) Inventor: Yi-Lin Li, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 11 days.

(21) Appl. No.: 17/383,384

(22) Filed: Jul. 22, 2021

(65) Prior Publication Data

US 2022/0121417 A1    Apr. 21, 2022

(30) Foreign Application Priority Data

Oct. 20, 2020   (TW) ................................. 109136191

(51) Int. Cl.
| | | |
|---|---|---|
| *H04M 3/00* | (2024.01) | |
| *G06F 3/16* | (2006.01) | |
| *H04M 1/60* | (2006.01) | |
| *H04M 5/00* | (2006.01) | |
| *H04R 5/033* | (2006.01) | |

(52) U.S. Cl.
CPC .................................. *G06F 3/165* (2013.01)

(58) Field of Classification Search
CPC .. H04R 2420/07; H04R 1/1083; H04R 5/033; H04R 1/1016; H04R 2460/01; H04R 1/023; H04R 2201/107; H04R 2410/05; H04R 2430/01; H04R 3/12; H04R 2499/11; H04R 2201/103; G10K 2210/1081; G10K 11/17854; G10K 2210/506; G10K 2210/505; G10K 2210/108; H04M 1/0258; H04M 2250/02; H04M 1/6066; H04M 1/19; H04M 1/6091; H04M 1/72412; H03G 3/001; H03G 5/165; H04S 3/004;
(Continued)

(56) References Cited

U.S. PATENT DOCUMENTS 10,536,191 B1 *   1/2020   De Laurentiis ...... H04R 1/1041
10,812,897 B1 *  10/2020   Arango-Vargas .... H04R 1/1008
(Continued)

FOREIGN PATENT DOCUMENTS

| CN | 105430570 A | 3/2016 |
|---|---|---|
| CN | 105959878 A | 9/2016 |
| TW | 200913758 | 3/2009 |

OTHER PUBLICATIONS

Generic Audio Working Group, Bluetooth® Profile Specification, "Common Audio Profile", Feb. 13, 2020, 61, d07r14, Bluetooth Special Interest Group, United States.
(Continued)

*Primary Examiner* — Kharye Pope
(74) *Attorney, Agent, or Firm* — Winston Hsu (57) ABSTRACT

The present invention provides a control method of an audio device, wherein the audio device includes the steps of: wirelessly receiving an audio signal from an audio communication device; processing the audio signal to generate a processed audio signal for playing; receiving a command signal, wherein the control signal indicates the audio device to execute an operation, and the control signal is not part of the audio signal; obtaining time information; and executes the operation at a specific time point based on the time information.

15 Claims, 9 Drawing Sheets

(58) Field of Classification Search
CPC .......... H04S 7/304; H04S 7/301; H04S 3/008; H04S 2400/15; H04S 3/00; H04S 7/307
USPC ........ 455/569.1, 570; 381/74, 71.1, 103, 56, 381/57; 704/226, 225
See application file for complete search history.

(56) References Cited

U.S. PATENT DOCUMENTS

| | | | | |
|---|---|---|---|---|
| 10,959,022 | B1* | 3/2021 | Baumbach | H04R 5/04 |
| 11,064,281 | B1* | 7/2021 | Batta | H04R 1/1041 |
| 11,153,678 | B1* | 10/2021 | Jorgovanovic | H04W 76/14 |
| 2017/0041724 | A1* | 2/2017 | Master | H04R 29/002 |
| 2017/0111834 | A1* | 4/2017 | Belverato | H04W 36/06 |
| 2017/0311105 | A1* | 10/2017 | Hariharan | H04R 29/001 |
| 2017/0366924 | A1* | 12/2017 | Thoen | H04M 1/6066 |
| 2019/0052961 | A1* | 2/2019 | Yun | G06F 3/165 |
| 2019/0129684 | A1* | 5/2019 | Willis | H04M 1/035 |
| 2019/0174557 | A1* | 6/2019 | Ueda | H04R 3/12 |
| 2019/0387304 | A1* | 12/2019 | Song | G06F 3/165 |
| 2020/0092630 | A1* | 3/2020 | Jin | H04R 1/1041 |
| 2020/0336820 | A1* | 10/2020 | Tasaka | H04N 5/76 |
| 2020/0336958 | A1* | 10/2020 | Sridhara | H04W 36/03 |
| 2021/0385575 | A1* | 12/2021 | Meiyappan | H04R 3/005 |
| 2021/0385886 | A1* | 12/2021 | Lo | H04W 76/10 |
| 2021/0409856 | A1* | 12/2021 | Zhu | H04R 1/1041 |
| 2022/0038769 | A1* | 2/2022 | Meiyappan | H04N 21/42203 |

OTHER PUBLICATIONS

Audio, Telephony, and Automotive Working Group, Bluetooth® Profile Specification, "Telephony and Media Audio Profile (TMAP)", Dec. 10, 2019, 44, d09r01, Bluetooth Special Interest Group, United States.

Generic Audio Working Group, Bluetooth® 0.5 Document, "Generic Audio Framework", Dec. 20, 2018, 59, d05r11, Bluetooth Special Interest Group, United States.

Generic Audio Working Group, Bluetooth® Service Specification, "Audio Stream Control Service", Nov. 25, 2019, 40, d09r02, Bluetooth Special Interest Group, United States.

Generic Audio Working Group, Bluetooth® Profile Specification, "Basic Audio Profile", Mar. 3, 2020, 105, d09r04, Bluetooth Special Interest Group, United States.

Generic Audio Working Group, Bluetooth® Profile Specification, "Hearing Aid Profile", Dec. 10, 2019, 20, d05r04, Bluetooth Special Interest Group, United States.

Milan, Bluetooth Core Specification, "Air Interface Protocol", Nov. 14, 2019, 106, 6, Bluetooth Special Interest Group, United States.

* cited by examiner

AUDIO DEVICE AND ASSOCIATED CONTROL METHOD

BACKGROUND OF THE INVENTION

1. Field of the Invention

The present invention relates to audio devices.

2. Description of the Prior Art

Current audio devices, such as wireless Bluetooth earphones, only consider the synchronization of the audio signals themselves (e.g., the synchronization of the sound played by the left-ear earphone and the right-ear earphone) when receiving audio signals transmitted from other devices, without considering the synchronization of other related control mechanisms. However, the control mechanisms, such as the noise reduction function or volume control function of the earphone itself, will also affect the sound played by the earphone. Therefore, if the control mechanisms are not synchronized between the left-ear earphone and the right-ear earphone, it will cause a short but significant difference in the sound played by the left-ear earphone and the right-ear earphone, thus affecting the listening quality of the user.

SUMMARY OF THE INVENTION

Therefore, one of the objectives of the present invention is to provide an audio device with control mechanism(s) synchronized with that of other audio device(s), so as to solve the problem of differences in the sound played by multiple audio devices in the prior art.

According to an embodiment of the present invention, a control method applied to an audio device is disclosed, which comprises the following steps: wirelessly receiving an audio signal from an audio communication device; processing the audio signal to generate a processed audio signal for playing; receiving a control signal, wherein the control signal is arranged to instruct the audio device to perform an operation, and the control signal is not part of the audio signal; obtaining a time information; and performing the operation at a specific time point according to the time information.

According to another embodiment of the present invention, an audio device is disclosed, which comprises a wireless communication module, a processing circuit and a playback component, wherein the wireless communication module is arranged to receive an audio signal from an audio communication device, the processing circuit is arranged to generate a processed audio signal by processing the audio signal, and the playback component is arranged to play the processed audio signal. In addition, the processing circuit further receives a control signal through the wireless communication module and obtains a time information, wherein the control signal is arranged to instruct the audio device to perform an operation, and the control signal is not part of the audio signal; and the audio device performs the operation at a specific time point according to the time information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
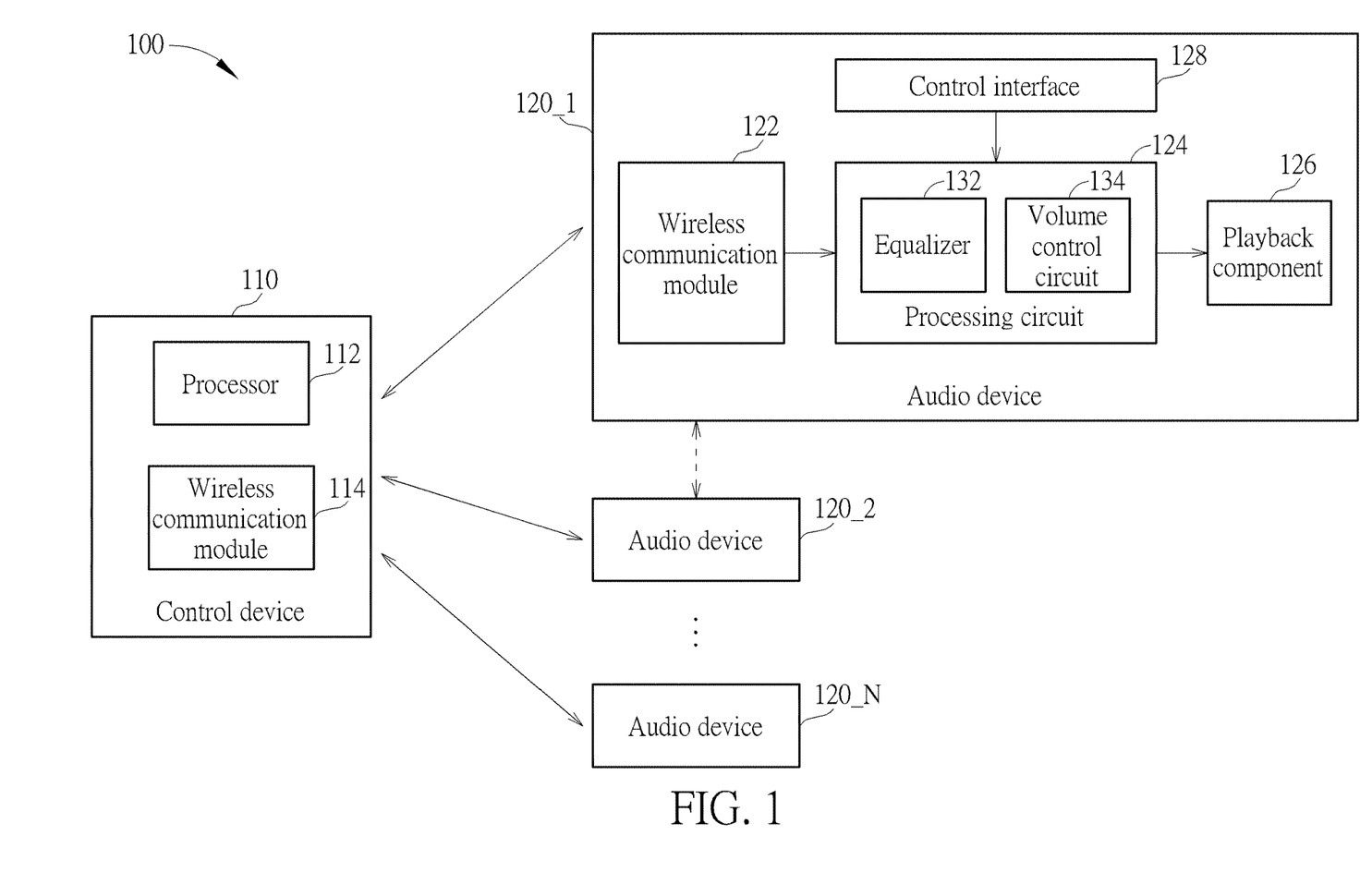
FIG. 1 is a diagram illustrating a system according to an embodiment of the present invention.

FIG. 1 is a diagram illustrating a system 100 according to an embodiment of the present invention. As shown in FIG. 1, the system 100 comprises a control device 110 and multiple audio devices 120_1-120_N, wherein the control device 110 comprises a processor 112 and a wireless communication module 114, and the audio device 120_1 comprises a wireless communication module 122, a processing circuit 124 comprising an equalizer 132 and a volume control circuit 134, a playback component 126 and a control interface 128. In addition, the internal structures of the audio devices 120_2-120_N can be the same as or similar to that of the audio device 120_1. For example, the audio device 120_2 can comprise all components except the control interface 128. In the present embodiment, N can be any positive integer greater than or equal to two, that is, the system 100 comprises two or more audio devices.

In one embodiment, the control device 110 can be an audio communication device arranged to transmit audio signals to the audio devices 120_1-120_N through the wireless communication module 114 for playing. In another embodiment, the control device 110 can be a smart watch, a smart phone or other remote control device, and is arranged to use the wireless transmission module 114 to control which channel the audio devices 120_1-120_N should be tuned to for receiving broadcast signals; and the audio devices 120_1-120_N can receive related broadcast signals (for example, broadcast signals from a TV or other broadcast devices) according to the set channel for playing. In another embodiment, the audio devices 120_1-120_N can be connected to other audio source devices and/or audio communication devices to play audio, and the control device 110 can be arranged to control the audio devices 120_1-120_N. In another embodiment, the control device 110 can also be an audio source that establishes a connection with the audio devices 120_1-120_N (e.g., a mobile phone that is connected to the audio devices 120_1-120_N for playing), and simultaneously controls the audio devices 120_1-120_N. In another embodiment, the control device 110 can be a smart phone or a mobile call device; the audio devices 120_1-120_N comprise a left-ear earphone and a right-ear earphone that can be connected to the control device 110, where one or both of the left-ear earphone and the right-ear earphone comprises microphone(s); and the control device 110 can perform bi-directional transmission of audio signals with the audio devices 120_1-120_N through the wireless communication module 114. In one embodiment, the wireless communication module 114 of the control device 110 and the wireless communication modules 122 of the audio devices 120_1-120_N all support the Bluetooth Low Energy (BLE) specification. That is, the control device 110 and the audio devices 120_1-120_N communicate with one another via Bluetooth signals. However, the present invention is not limited to this.

In addition, the audio signal transmitted by the control device 110 or other broadcast devices may be encoded audio signal, that is, the audio signal may be encoded by using sub-band coding (SBC), advanced audio coding-low complexity (AAC-LC), MP3, low complexity communications codec (LC3), OPUS codec, or any other appropriate encoding method before the transmission. Similarly, the audio devices 120_1-120_N may use the corresponding decoding method to decode the received audio signal, then the decoded audio signal is played.

Taking the audio device 120_1 as an example for illustrating operations of the audio devices 120_1-120_N, the wireless communication module 122 receives an audio signal from an audio communication device (e.g., the control device 110 or other audio source device), and sends the audio signal to the processing circuit 124 for processing. The audio communication device and the control device 110 for generating the control signal can be the same device or different devices. In the present embodiment, the processing circuit 124 can use the equalizer 132 to performing filtering and noise reduction of the audio signal, and can use the volume control circuit 134 to adjust the volume of the audio signal, so as to generate a processed audio signal. Finally, the playback component 126 plays the processed audio signal for the user to listen to. In the present embodiment, the control interface 128 can comprise at least one physical button, at least one physical scroll wheel or other physical control elements to control the parameters of the equalizer 132 and/or the volume control circuit 134, such as Active Noise Cancellation (ANC) or ambient sound mode.

In one embodiment, although the audio device 120_1 can adjust the internal parameters of the processing circuit 124 through its own control interface 128, the user can further send related control signals to the audio device 120_1 through the control device 110 or other audio control devices. For example, the control device 110 is an electronic device with a screen, and the user can control the parameters of the processing circuits 124 inside the audio device 120_1 and/or the audio devices 120_2-120_N through the control interface displayed on the screen, so as to change the degree of noise reduction and the volume. In the present embodiment, since the operation of the control interface 128 is essentially performed by the control device 110, the control interface 128 can be removed from the audio device 120_1.

In one embodiment, the audio device 120_1 and the audio device 120_2 can be used as a left-ear earphone and a right-ear earphone, and the audio device 120_2 itself does not have the control interface 128. Therefore, when the user changes the parameters in the equalizer 132 or the volume control circuit 134 through the control interface 128, the processing circuit 124 of the audio device 120_1 will also transmit the related control signals to the audio device 120_2 through the wireless communication module 122, so that the equalizer and the volume control circuit inside the audio device 120_2 can also be adjusted accordingly. In another embodiment, both the audio device 120_1 and the audio device 120_2 have the control interface 128, and when the user changes the parameters through the control interface 128 of one of the audio devices 120_1 and 120_2, the processing circuit 124 of the audio device 120_1/120_2 also transmits related control signals to another audio device 120_1/120_2 through the wireless communication module 122, so that the internal parameters of the two audio devices 120_1 and 120_2 are adjusted synchronously.

However, during the process of changing the parameters of the internal processing circuit 124 of the audio devices 120_1-120_N as mentioned in the above embodiment, the audio signals will be affected. Therefore, the present invention proposes multiple methods for synchronizing control signals in the following embodiments, which can keep the audio devices 120_1-120_N synchronized during the audio signal change, so as to avoid the difference in the sound that the user hears on the audio devices 120_1-120_N.

Figure 2:
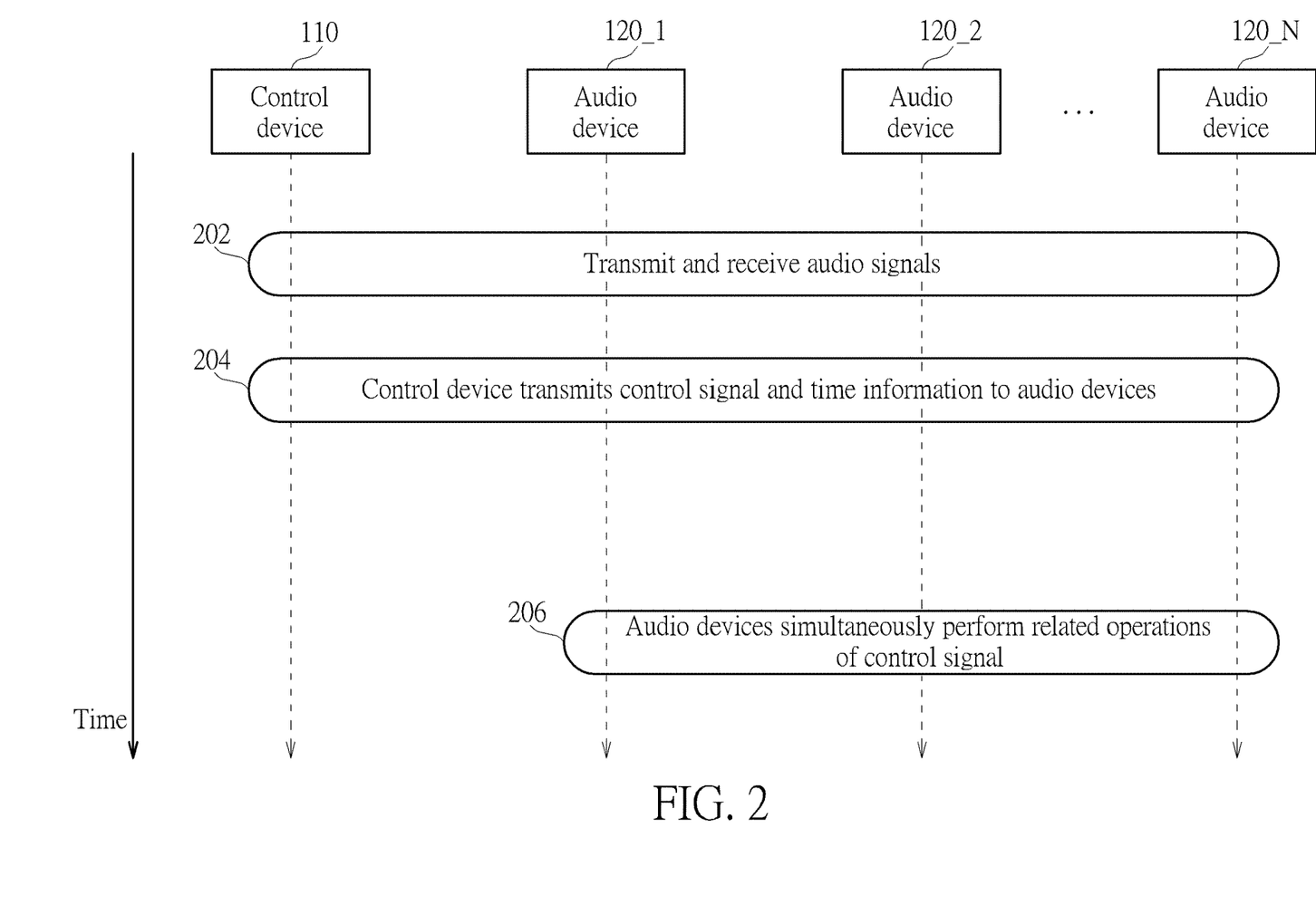
FIG. 2 is a flowchart of a control method of audio devices according to a first embodiment of the present invention.

FIG. 2 is a flowchart of a control method of the audio devices 120_1-120_N according to a first embodiment of the present invention. In step 202, the audio devices 120_1-120_N can receive audio signals from the control device 110 or other audio communication devices, and perform sound playback. In step 204, the control device 110 transmits a control signal and related time information to the audio devices 120_1-120_N, wherein the control signal is arranged to control the parameters of the internal processing circuit 124 of the audio devices 120_1-120_N, such as the parameters of the equalizer 132 and/or the volume control circuit 134 or the parameters of other different audio device control, such as Active Noise Cancellation or ambient sound mode, and the control signal can be further arranged to control the audio devices 120_1-120_N to generate a prompt tone or other control/operation different from the currently transmitted/received audio signal. In addition, the time information can be a time point at which the audio devices 120_1-120_N perform related operations corresponding to the control signal. In one example, the time information can be a time point of a certain connection event specified in the Bluetooth Low Energy specification, or the time information can be a certain connection event time point plus a specific time offset, or the time information can be any information that can represent a specific time point. In step 206, the audio devices 120_1-120_N perform the related operations of the control signal at a same time point according to the time information received in step 204. Specifically, if the control signal indicates that the noise reduction function should be strengthened, the audio devices 120_1-120_N synchronously change the parameters of the noise reduction function at the time point indicated by the time information; if the control signal indicates that the volume should be adjusted, the audio devices 120_1-120_N synchronously changes the internal parameters of the internal volume control circuit 134 at the time point indicated by the time information, so as to simultaneously increase or decrease the volume of the sound played by the audio devices 120_1-120_N; if the control signal indicates that a prompt tone should be played, the audio devices 120_1-120_N synchronously generate and play the prompt tone at the time point indicated by the time information.

Figure 3:
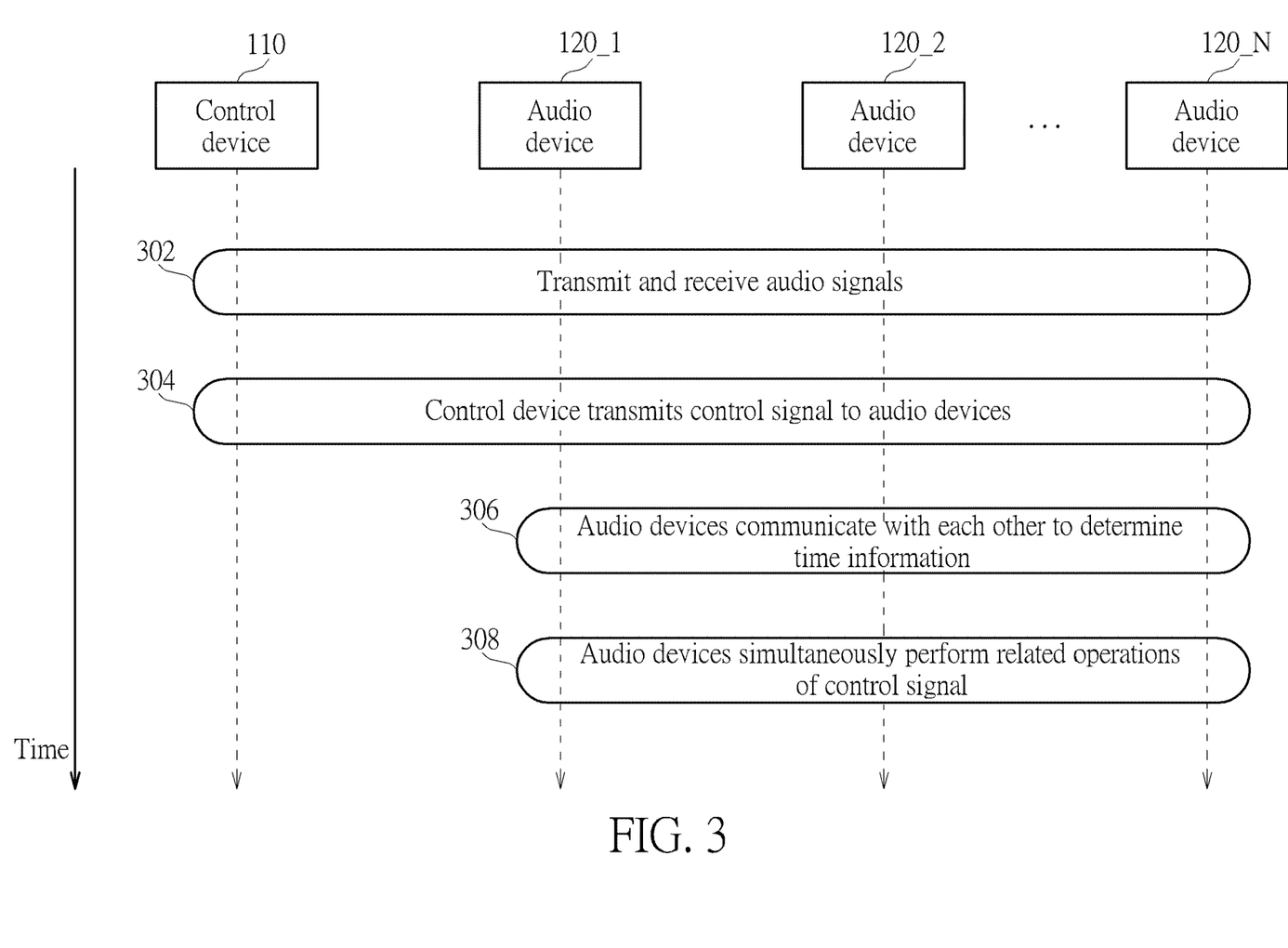
FIG. 3 is a flowchart of a control method of audio devices according to a second embodiment of the present invention.

FIG. 3 is a flowchart of a control method of the audio devices 120_1-120_N according to a second embodiment of the present invention. In step 302, the audio devices 120_1-120_N can receive audio signals from the control device 110 or other audio communication devices, and perform sound playback. In step 304, the control device 110 transmits a control signal to the audio devices 120_1-120_N, wherein the control signal is arranged to control the parameters of the internal processing circuit 124 of the audio devices 120_1-120_N or other audio device control, and the control signal can be further arranged to control the audio devices 120_1-120_N to generate a prompt tone different from the currently transmitted/received audio signal. In step 306, the audio devices 120_1-120_N communicate with each other to determine the time information for performing the operations corresponding to the control signal together. For example, the audio devices 120_1-120_N can determine the time information through any suitable negotiation mechanism. In step 308, the audio devices 120_1-120_N perform the related operations of the control signal at a same time point according to the time information determined in step 306.

Figure 4:
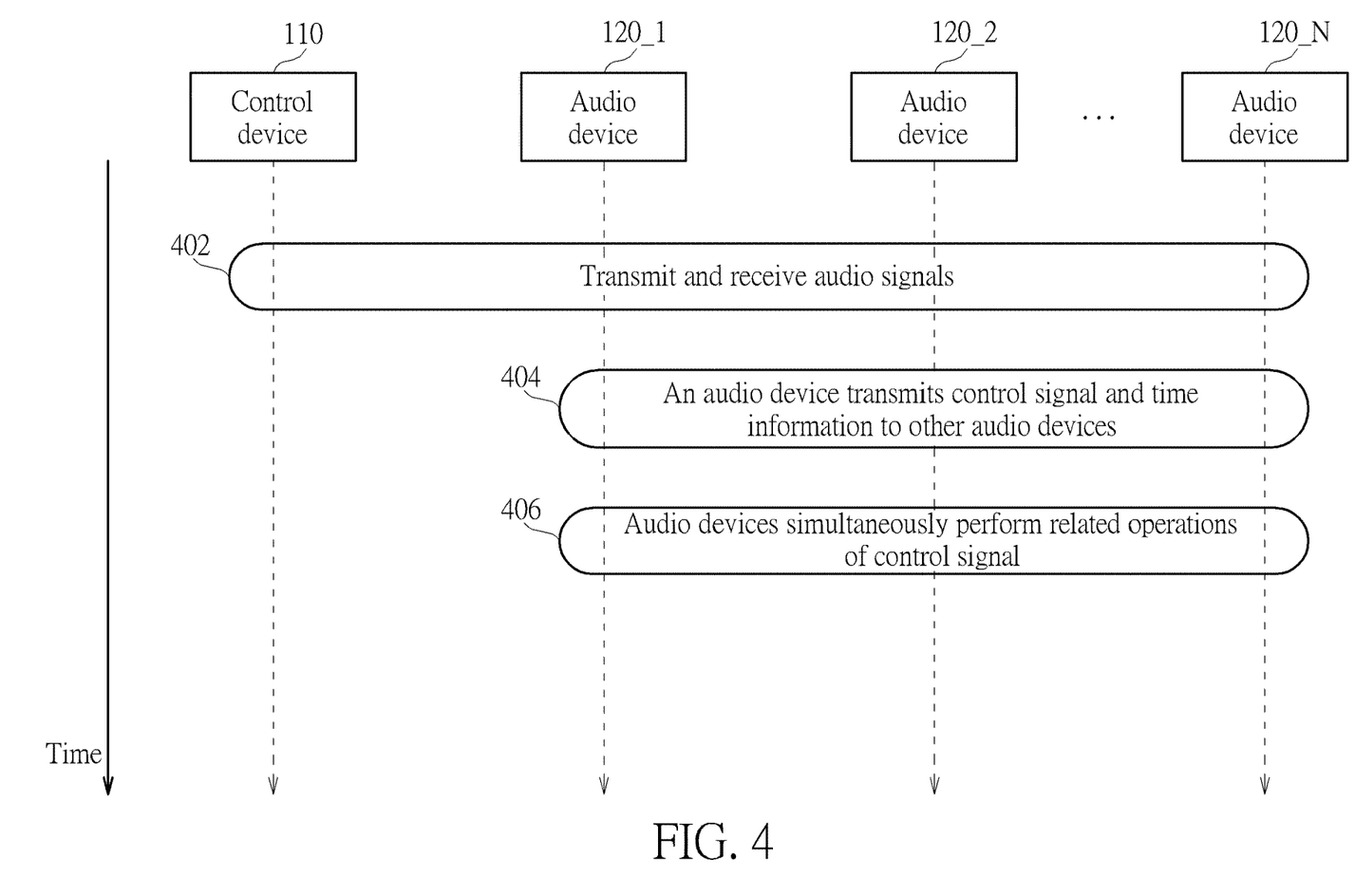
FIG. 4 is a flowchart of a control method of audio devices according to a third embodiment of the present invention.

FIG. 4 is a flowchart of a control method of the audio devices 120_1-120_N according to a third embodiment of the present invention. In step 402, the audio devices 120_1-120_N can receive audio signals from the control device 110 or other audio communication devices, and perform sound playback. In step 404, the audio device 120_1 transmits a control signal and related time information to other audio devices 120_2-120_N, wherein the control signal can be generated by the user through the control interface 128, and is arranged to control the parameters of the internal processing circuit 124 of the audio devices 120_1-120_N or other audio device control, and the control signal can be further arranged to control the audio devices 120_1-120_N to generate a prompt tone different from the currently transmitted/received audio signal. In addition, the time information can be a time point at which the audio devices 120_1-120_N perform related operations corresponding to the control signal. In step 406, the audio devices 120_1-120_N perform the related operations of the control signal at the same time point according to the time information received in step 404.

Figure 5:
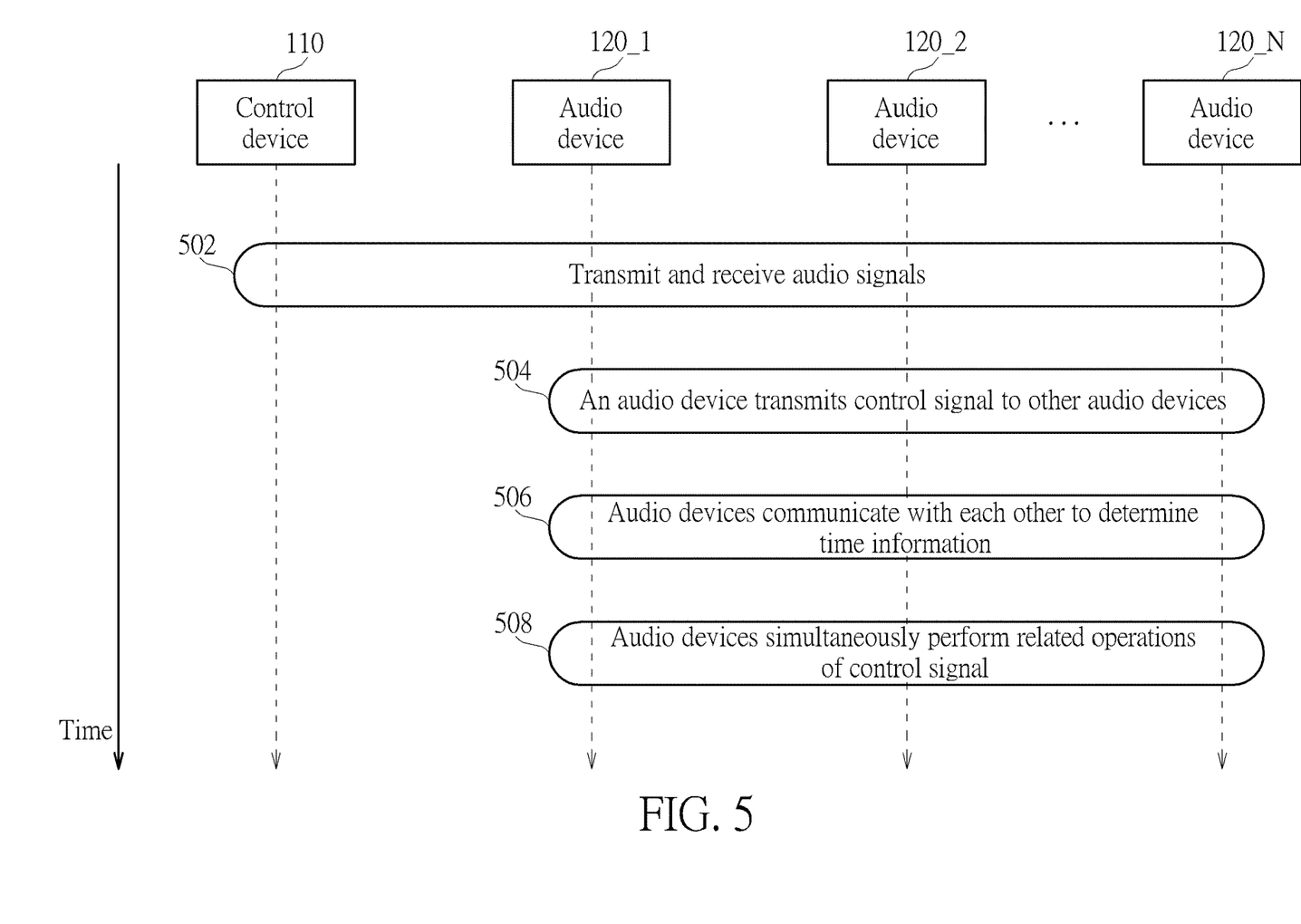
FIG. 5 is a flowchart of a control method of audio devices according to a fourth embodiment of the present invention.

FIG. 5 is a flowchart of a control method of the audio devices 120_1-120_N according to a fourth embodiment of the present invention. In step 502, the audio devices 120_1-120_N can receive audio signals from the control device 110 or other audio communication devices, and perform sound playback. In step 504, the audio device 120_1 transmits a control signal to other audio devices 120_2-120_N, wherein the control signal can be generated by the user through the control interface 128, and is arranged to control the parameters of the internal processing circuit 124 of the audio devices 120_1-120_N or other audio device control, and the control signal can be further arranged to control the audio devices 120_1-120_N to generate a prompt tone different from the currently transmitted/received audio signal. In step 506, the audio devices 120_1-120_N communicate with each other and determine the time information for performing operations corresponding to the control signal together through any suitable negotiation mechanism. In step 508, the audio devices 120_1-120_N perform the related operations of the control signal at a same time point according to the time information determined in step 506.

Figure 6:
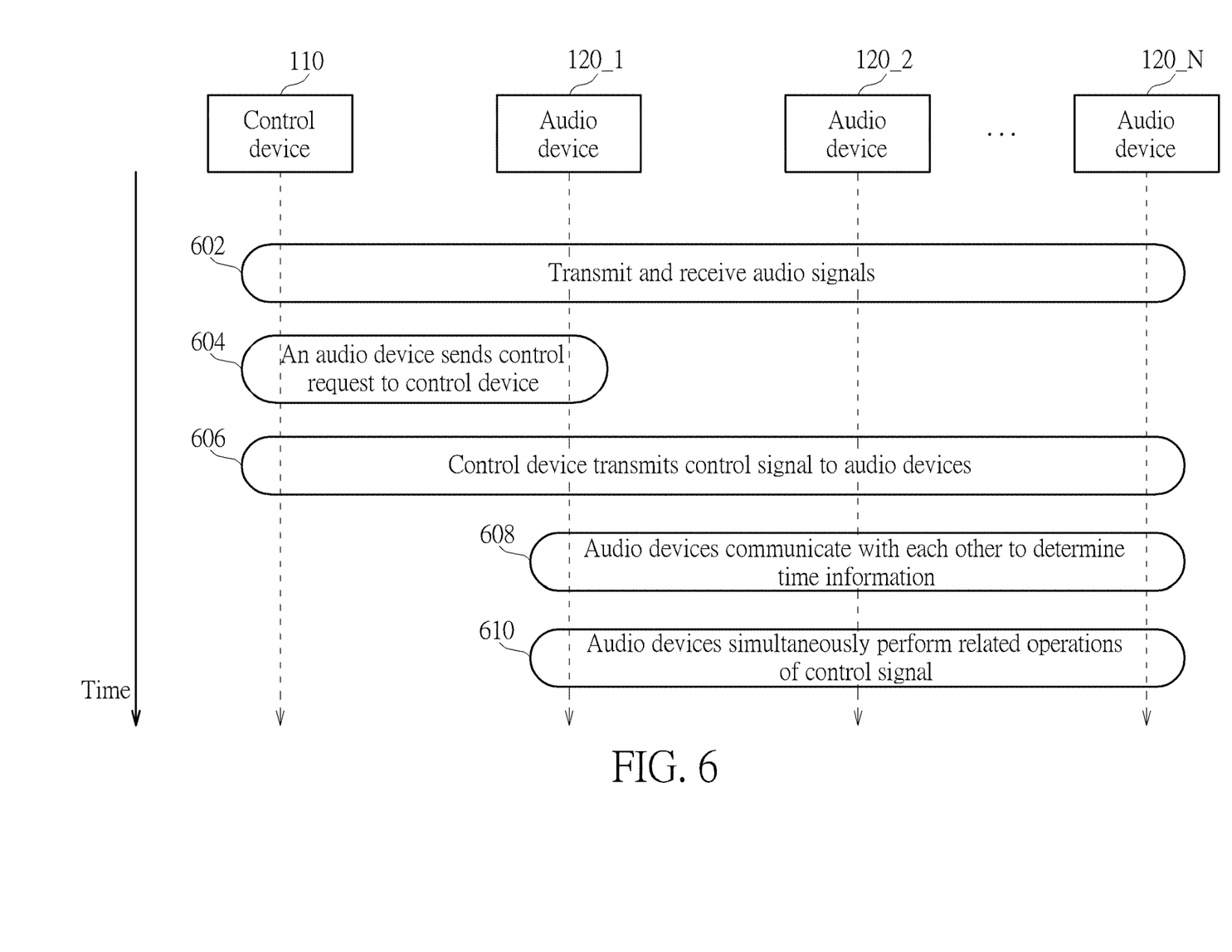
FIG. 6 is a flowchart of a control method of audio devices according to a fifth embodiment of the present invention.

FIG. 6 is a flowchart of a control method of the audio devices 120_1-120_N according to the fifth embodiment of the present invention. In step 602, the audio devices 120_1-120_N can receive audio signals from the control device 110 or other audio communication devices, and perform sound playback. In step 604, the audio device 120_1 sends a control request to the control device 110, wherein the control request can be generated by the user through the control interface 128, and the control request requires the control device 110 to assist in controlling the audio devices 120_1-120_N, or to assist in controlling the audio devices 120_1-120_N to generate a prompt tone different from the currently transmitted/received audio signal. In step 606, the control device 110 transmits a control signal to the audio devices 120_1-120_N, wherein the control signal is generated according to the control request and has the same instruction specified by the control request. In step 608, the audio devices 120_1-120_N communicate with each other and determine time information for performing operations corresponding to the control signal together, for example, through any suitable negotiation mechanism. In step 610, the audio devices 120_1-120_N perform the related operations of the control signal at a same time point according to the time information determined in step 608.

Figure 7:
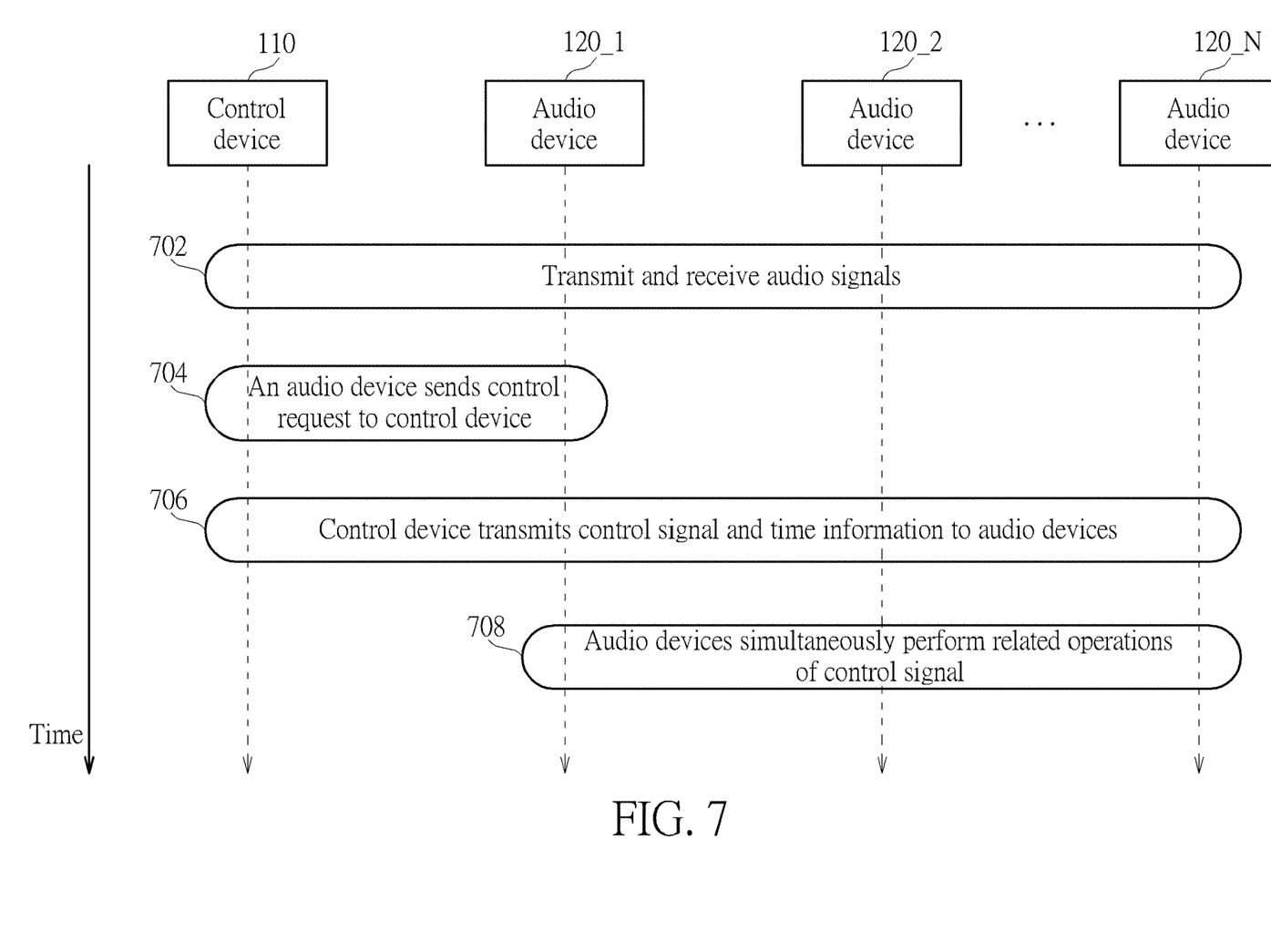
FIG. 7 is a flowchart of a control method of audio devices according to a sixth embodiment of the present invention.

FIG. 7 is a flowchart of a control method of the audio devices 120_1-120_N according to a sixth embodiment of the present invention. In step 702, the audio devices 120_1-120_N can receive audio signals from the control device 110 or other audio communication devices, and perform sound playback. In step 704, the audio device 120_1 sends a control request to the control device 110, wherein the control request can be generated by the user through the control interface 128, and the control request requires the control device 110 to assist in controlling the audio devices 120_1-120_N, or to assist in controlling the audio devices 120_1-120_N to generate a prompt tone different from the currently transmitted/received audio signal. In step 706, the control device 110 transmits a control signal and related time information to the audio devices 120_1-120_N, wherein the control signal is generated according to the control request and has the same instruction specified by the control request, and the time information can be a time point at which the audio devices 120_1-120_N perform related operations corresponding to the control signal. In step 708, the audio devices 120_1-120_N perform the related operations of the control signal at the same time point according to the time information received in step 706.

Figure 8:
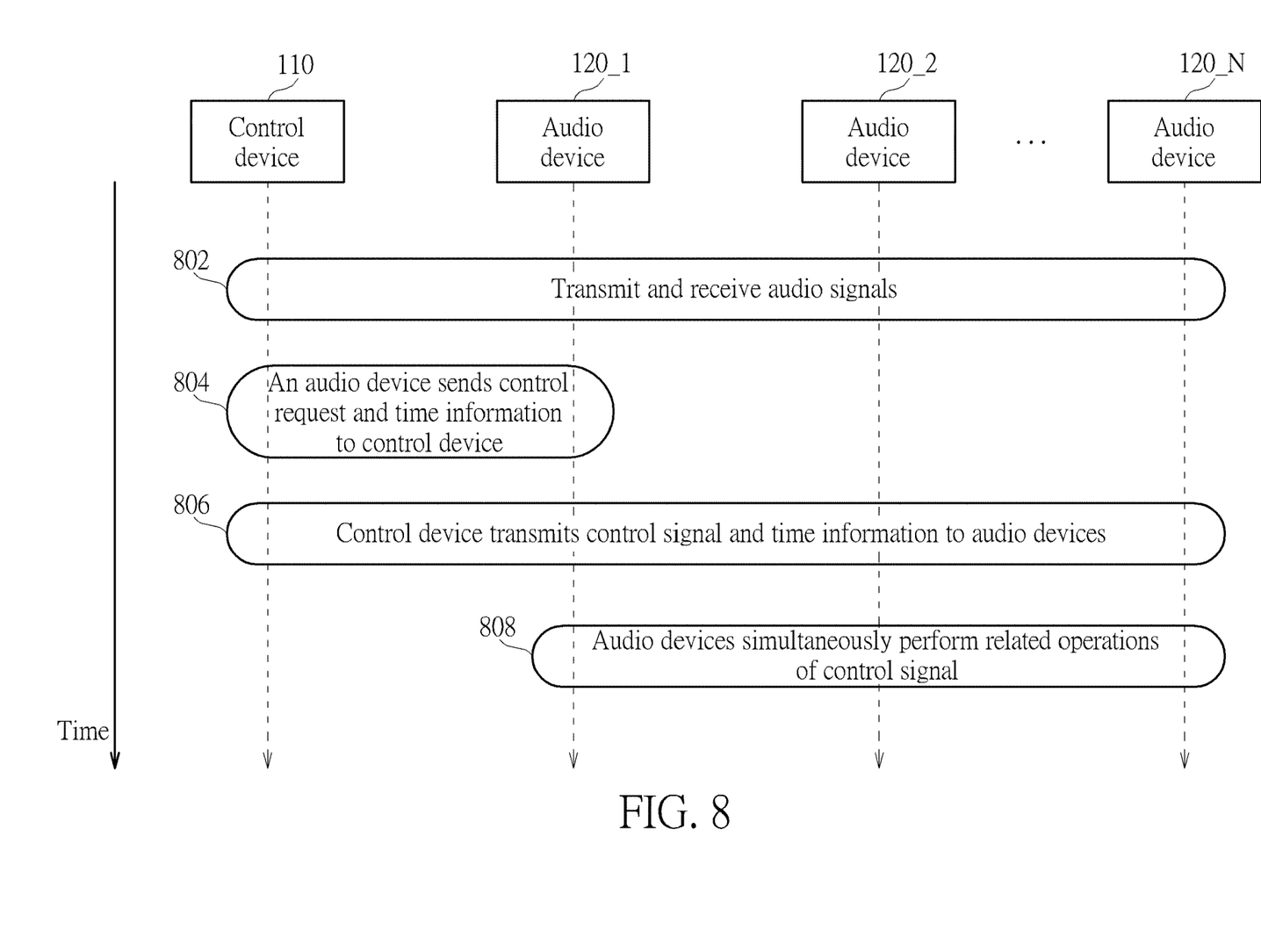
FIG. 8 is a flowchart of a control method of audio devices according to a seventh embodiment of the present invention.

FIG. 8 is a flowchart of a control method of the audio devices 120_1-120_N according to a seventh embodiment of the present invention. In step 802, the audio devices 120_1-120_N can receive audio signals from the control device 110 or other audio communication devices, and perform sound playback. In step 804, the audio device 120_1 transmits a control request and corresponding time information (which may be considered as initial time information) to the control device 110, wherein the control request can be generated by the user through the control interface 128, and the control request requires the control device 110 to assist in controlling the audio devices 120_1-120_N, or to assist in controlling the audio devices 120_1-120_N to generate a prompt tone different from the currently transmitted/received audio signal. In addition, the time information can be a time point at which the audio devices 120_1-120_N perform related operations corresponding to the control signal. In step 806, the control device 110 transmits a control signal and related time information to the audio devices 120_1-120_N, wherein the control signal is generated according to the control request and has the same instruction specified by the control request, and the time information can be generated according to the time information received in step 804. For example, the control device 110 transmits the time information provided by the audio device 120_1 to all the audio devices 120_1-120_N. In one embodiment, the control device 110 can generate the control signal and related time information to the audio devices 120_1-120_N by referring to the control request sent by the audio device 120_1 and the content of the corresponding time information. In another embodiment, the control device 110 can directly forward the control request and the corresponding time information sent by the audio device 120_1 to the audio devices 120_1-120_N, without parsing the received content. In step 808, the audio devices 120_1-120_N perform the related operations of the control signal at a same time point according to the time information received in step 806.

Figure 9:
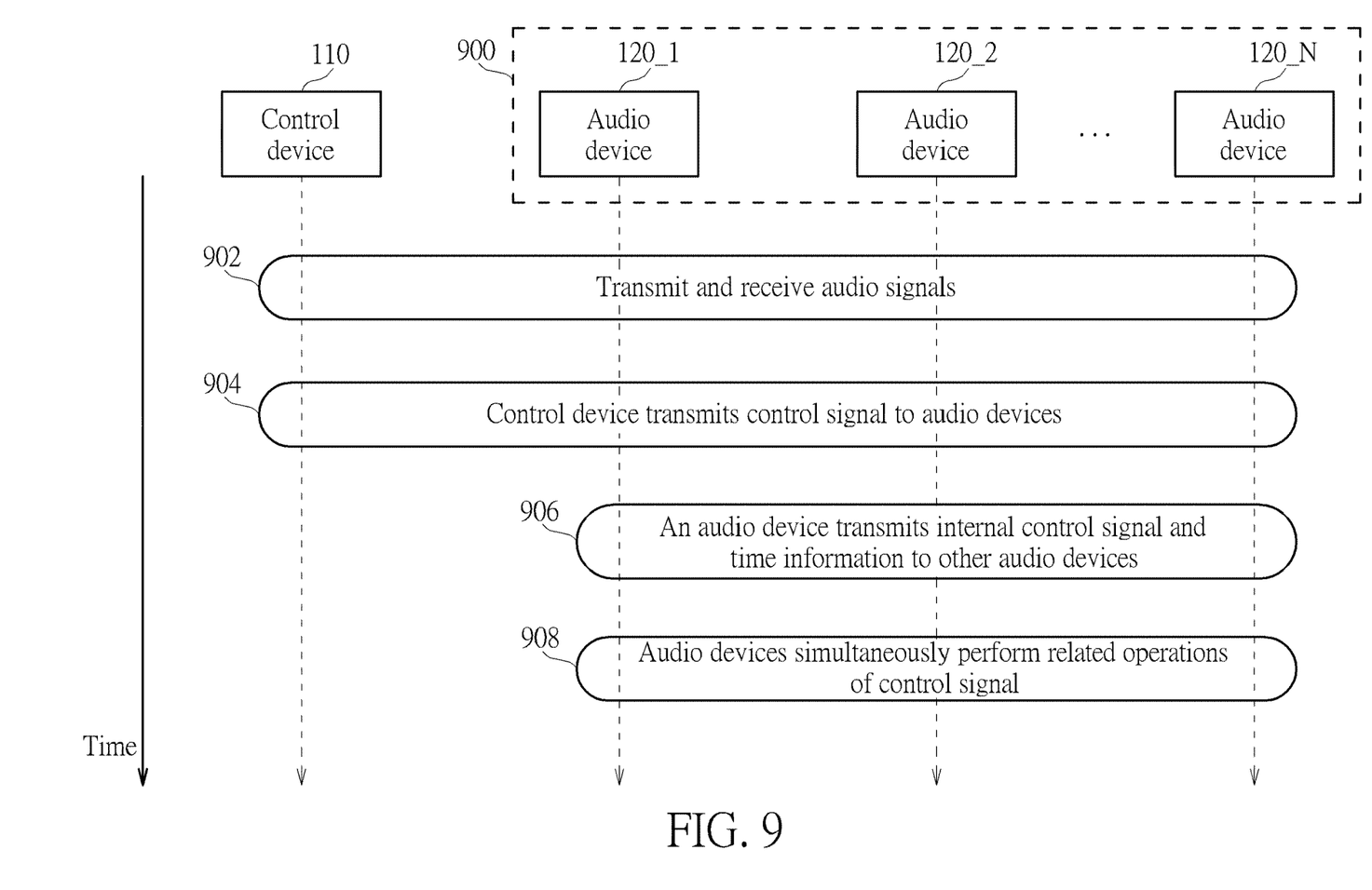
FIG. 9 is a flowchart of a control method of audio devices according to an eighth embodiment of the present invention.

FIG. 9 is a flowchart of a control method of the audio devices 120_1-120_N according to an eighth embodiment of the present invention, wherein the audio devices 120_1-120_N form a group 900 by themselves, there is a master audio device in the group 900 (the audio device 120_1 is taken as an example below), and the audio device 120_1 can control operations of other slave audio devices including the audio devices 120_2-120_N. In step 902, the audio devices 120_1-120_N can receive audio signals from the control device 110 or other audio communication devices, and perform sound playback. In step 904, the control device 110 transmits a control signal to the audio devices 120_1-120_N, wherein the control signal is arranged to control the parameters of the internal processing circuit 124 of the audio devices 120_1-120_N or other audio device control, and the control signal can be further arranged to control the audio devices 120_1-120_N to generate a prompt tone different from the currently transmitted/received audio signal. In step 906, the audio device 120_1 transmits a group control signal and related time information to other audio devices 120_2-120_N, wherein the content indicated by the group control signal is the same as the content of the control signal sent by the control device 110. In step 908, the audio devices 120_1-120_N perform the related operations of the control signal at a same time point according to the time information in step 906.

It should be noted that, in the above-mentioned embodiments, the control signal itself is not part of the audio signal. That is, when the audio devices 120_1-120_N perform related operations of the control signal, the audio signal from the control device 110 or other devices can be played continuously, but the related operations of the control signal can affect the sound played by the playback component 126, for example, due to mixing with the prompt tone, processing the ambient sound, etc. In addition, the control signal is not limited to changing the degree of noise reduction, changing the volume or playing the prompt tone as described in the above embodiments. As long as the control signal relates to the sound played by the playback component 126, the control signal can correspond to other operations, such as muting or enabling the audio devices 120_1-120_N.

Summarizing the present invention briefly, in the control method of multiple audio devices of the present invention, the control mechanisms of multiple audio devices can be synchronized with each other to perform related operations at a same time point, so as to avoid the control mechanisms causing differences in sound playback of multiple audio devices. Therefore, the multiple audio devices of the present invention can improve the audio playback quality or user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of an audio device, comprising:
   wirelessly receiving an audio signal from an audio communication device;
   processing the audio signal to generate a processed audio signal for playing;
   receiving a control signal, wherein the control signal is arranged to instruct the audio device to perform an operation, the control signal is not part of the audio signal, and the operation corresponding to the control signal is not playing the audio signal;
   obtaining a time information; and
   performing the operation corresponding to the control signal at a specific time point according to the time information;
   wherein the audio device is a first audio device, and the step of obtaining the time information comprises:
      negotiating, by the first audio device, with a second audio device to generate the time information, for enabling the first audio device and the second audio device simultaneously to perform the operation at the specific time point according to the time information.

2. The control method of claim 1, wherein the step of receiving the control signal comprise:
   receiving the control signal from a control device, wherein the control signal is provided to the first audio device and the second audio device.

3. The control method of claim 1, wherein the control method further comprises:
   transmitting the control signal to the second audio device.

4. The control method of claim 1, wherein the control method further comprises:
   sending a control request to a control device for requesting the control device to send the control signal corresponding to the control request to the first audio device and the second audio device.

5. The control method of claim 1, wherein the control method further comprises:
   sending a control request and an initial time information to a control device for requesting the control device to send the control signal corresponding to the control request to the first audio device and the second audio device.

6. The control method of claim 1, wherein the first audio device and the second audio device are in a group, and receiving the control signal and obtaining the time information comprise:
   transmitting a group control signal and the time information to the second audio device, for enabling the first audio device and the second audio device to simultaneously perform the operation at the specific time point according to the time information, wherein the group control signal is generated according to the control signal.

7. The control method of claim 1, wherein the operation is to adjust noise reduction degree of the audio device, adjust volume of the audio device, or control the audio device to play a prompt tone.

8. An audio device, comprising:
   a wireless communication module, arranged to receive an audio signal from an audio communication device;
   a processing circuit, coupled to the wireless communication module and arranged to process the audio signal to generate a processed audio signal; and
   a playback component, coupled to the processing circuit and arranged to play the processed audio signal;
   wherein the processing circuit further receives a control signal through the wireless communication module, and obtains a time information, wherein the control signal is arranged to instruct the audio device to perform an operation, the control signal is not part of the audio signal, and the operation corresponding to the control signal is not playing the audio signal; and the audio device performs the operation corresponding to the control signal at a specific time point according to the time information;
   wherein the audio device is a first audio device, and the first audio device negotiates with a second audio device to generate the time information, for enabling the first audio device and the second audio device to simultaneously perform the operation at the specific time point according to the time information.

9. The audio device of claim 8, wherein the processing circuit receives the control signal through the wireless communication module, wherein the control signal is provided to the first audio device and the second audio device.

10. The audio device of claim 8, wherein the processing circuit further transmits the control signal to the second audio device through the wireless communication module.

11. The audio device of claim 8, wherein the processing circuit sends a control request to a control device through the wireless communication module to request the control device to send the control signal corresponding to the control request to the first audio device and the second audio device.

12. The audio device of claim 8, wherein the processing circuit further sends a control request and an initial time information to a control device through the wireless communication module to request the control device to send the control signal corresponding to the control request to the first audio device and the second audio device.

13. The audio device of claim 8, wherein the first audio device and the second audio device are in a group; and the processing circuit transmits a group control signal and the time information to the second audio device through the wireless communication module, for enabling the first audio device and the second audio device to simultaneously perform the operation at the specific time point according to the time information, wherein the group control signal is generated according to the control signal.

14. The audio device of claim 8, wherein the operation is to adjust noise reduction degree of the audio device, adjust volume of the audio device, or control the audio device to play a prompt tone.

15. An audio device, comprising:
- a wireless communication module, arranged to receive an audio signal from an audio communication device;
- a processing circuit, coupled to the wireless communication module and arranged to process the audio signal to generate a processed audio signal; and
- a playback component, coupled to the processing circuit and arranged to play the processed audio signal;
- wherein the processing circuit further receives a control signal through the wireless communication module, and obtains a time information, wherein the control signal is arranged to instruct the audio device to perform an operation, the control signal is not part of the audio signal, and the operation corresponding to the control signal is not playing the audio signal; and the audio device performs the operation corresponding to the control signal at a specific time point according to the time information;
- wherein the audio device is a first audio device, and the first audio device transmits the control signal and the time information to a second audio device through the wireless communication module, for enabling the first audio device and the second audio device to simultaneously perform the operation at the specific time point according to the time information.

* * * * *